US006697144B2

(12) United States Patent
Kralik

(10) Patent No.: US 6,697,144 B2
(45) Date of Patent: Feb. 24, 2004

(54) SWITCHABLE MIRRORS AND RETARDERS BASED ON IMBIBED NANO-COLUMN FILMS

(75) Inventor: John C. Kralik, Lansdale, PA (US)

(73) Assignee: Agilent Technologies, Inc., Palo Alto, CA (US)

( * ) Notice: Subject to any disclaimer, the term of this patent is extended or adjusted under 35 U.S.C. 154(b) by 223 days.

(21) Appl. No.: 10/024,749

(22) Filed: Dec. 19, 2001

(65) Prior Publication Data

US 2002/0154261 A1 Oct. 24, 2002

Related U.S. Application Data

(60) Provisional application No. 60/258,959, filed on Dec. 29, 2000.

(51) Int. Cl.[7] .................. G02F 1/1335; G02F 1/13; C09K 19/02
(52) U.S. Cl. .............. 349/186; 349/115; 349/193; 349/194; 349/117
(58) Field of Search ........................ 349/193, 194, 349/115, 186, 117; 430/20

(56) References Cited

U.S. PATENT DOCUMENTS

| | | | | |
|---|---|---|---|---|
| 5,799,231 A | * | 8/1998 | Gates et al. ................. | 349/115 |
| 5,812,233 A | * | 9/1998 | Walsh et al. ................ | 349/194 |
| 5,866,204 A | | 2/1999 | Robbie et al. .............. | 427/256 |
| 5,928,819 A | * | 7/1999 | Crawford et al. ............. | 430/20 |
| 6,072,629 A | | 6/2000 | Fan et al. ................... | 359/497 |
| 6,252,710 B1 | | 6/2001 | Fan et al. ................... | 359/495 |

OTHER PUBLICATIONS

"New technique of aligning liquid crystals on surfaces", *Applied Physics Letters*, vol. 29, No. 11, Dec. 1, 1976, p. 691.

I.J. Hodgkinson and Peter W. Wilson, "Microstructural–Induced Anisotropy in Thin Films for Optical Applications", *CRC Critical Reviews in Solid State and Materials Sciences*, vol. 15 Issue 1 (1988), pp. 27–61.

Tomoyoshi Motohiro and Y. Taga, "Thin film retardation plate by oblique deposition", *Applied Optics*, vol. 28, No. 13, Jul. 1, 1989, pp. 2466–2482.

R.M.A. Azzam, "Chiral thin solid films: Method of deposition and applications", American Institute of Physics, *Appl. Phys. Lett.*, vol. 61, No. 26, Dec. 28, 1992, pp. 3118–3120.

B. Fan, et al., "Optical circular dichroism of vacuum–deposited film stacks", *Optics Communications*, 147 (1998), pp. 265–268.

Ian Hodgkinson and Qi Hong Wu, "Birefringent thin–film polarizers for use at normal incidence and with planar technologies", *Applied Physics Letters*, vol. 74, No. 13, Mar. 29, 1999, pp. 1794–1796.

P.G. deGennes and J. Prost, "The physics of Liquid Crystals", *Clarendon Press*, Second Edition (Table of Contents).

John L. Janning, "Thin film surface orientation for liquid crystals", *Appl. Phys. Lett.*, vol. 21, No. 14, Aug. 15, 1972, pp. 174–174.

(List continued on next page.)

*Primary Examiner*—Julie Ngo

(57) ABSTRACT

Switchable optical components such as switchable mirrors and variable retarders are fabricated using a unique class of materials. These materials are thin film composites comprising of porous inorganic films imbibed with liquid crystal materials.

16 Claims, 5 Drawing Sheets

OTHER PUBLICATIONS

Lawrence A. Goodman, et al. "Topography of Obliquely Evaporated Silicon Oxide Films and Its Effect on Liquid–Crystal Orientation", *IEEE Transactions on Electron Devices*, vol. ED–24, No. 7, Jul., 1977, pp. 795–804.

Julian Cheng, et al., "A scanning electron microscope study of columnar topography and liquid–crystal alignment on obliquely deposited oxide surfaces at low rates", *Appl. Phys. Lett*, Oct. 15, 1990, pp. 716–719.

A. Lakhtakia, et al., "Sculptured Thin Films (STFS) For Optical, Chemical and Biological Applications", *Innovations in Materials Research*, vol. 1, No. 2 (1996) 165–176, World Scientific Publishing, pp. 2–13.

Aklesh Lakhtakia and Vijayakumar C. Venugopal, "Dielectric Thin–Film Helicoidal Bianistropic Medium Bilayers as Tunable Polarization–Independent Laser Mirrors and Notch Filters", *Microwave and Optical Technology Letters*, vol. 17, No. 2, Feb. 5, 1998, pp. 135–140.

D. Rogovin, "Phase conjugation in liquid suspensions of microellipsoids in the diffusive limit", *The American Physical Society*, Physical Review A, vol. 32, No. 5, Nov. 1985, pp. 2837–2856.

W.L. Bragg and A.B. Pippard, "The Form Birefringence of Macromolecules", *Acta Cryst.* (1953), 6, 865, pp. 865–867.

Dwight W. Berreman, "Optics in Stratified and Anisotropic Media: 4 X 4–Matrix Formulation", *Journal of the Optical Society of America*, vol. 62, No. 4, Apr. 1972, pp. 502–510.

Takezoe et al., *The Japanese Journal of Applied Physics*, 22(7), 1080 (1983).

* cited by examiner

SWITCHABLE MIRRORS AND RETARDERS BASED ON IMBIBED NANO-COLUMN FILMS

CROSS REFERENCE TO RELATED APPLICATIONS

This application claims priority of U.S. Provisional Application Ser. No. 60/258,959 filed Dec. 29, 2000 entitled SWITCHABLE MIRRORS AND RETARDERS BASED ON IMBIBED NANO-COLUMN FILMS which is incorporated herein by reference.

STATEMENT OF GOVERNMENT INTEREST

This invention was made partially with U.S. Government support from the National Science Foundation under Grant No. DMI-9860582. The U.S. Government has certain rights in the invention.

FIELD OF THE INVENTION

The present invention relates generally to switchable optical devices, and, more particularly, to switchable optical components such as switchable mirrors and variable retarders and their fabrication.

BACKGROUND OF THE INVENTION

The art of producing useful optical components based on porous thin films fabricated via the method of vacuum deposition of inorganic materials at oblique angles has steadily evolved over the latter half of the $20^{th}$ century. In a seminal article appearing in Nature 183, 104 (1959), Young and Kowal describe the remarkable observation of optical activity in obliquely deposited films made using a material which is found otherwise to be optically isotropic. They achieved this result by depositing the material at an oblique incidence angle on a rotating substrate. Hodgkinson and Wilson review subsequent work that elucidates the relationship between the structure and properties of obliquely deposited thin films in an article entitled "Microstructural-induced anisotropy in thin films for optical applications," appearing in CRC Critical Reviews in Solid State and Materials Sciences 15 (1), 27 (1988).

There are several noteworthy technologies based on obliquely deposited thin films. First is the optical retardation plate, as described by Motohiro and Taga in Applied Optics 28 (13), 2466 (1989). Motohiro and Taga demonstrated a quarter-wave retarder at a wavelength of 546 nm using an obliquely deposited $Ta_2O_5$ thin film structure. In that work, the anisotropy of the $Ta_2O_5$ film is attributed to form birefringence of inclined $Ta_2O_5$ nano-columns formed on the substrate during the deposition process.

A second technology is a high spatial frequency chiral thin film structure, proposed in a theoretical work by Azzam in Applied Physics Letters 61 (26), 3118 (1992). This structure bears similarity to the films fabricated by Young and Kowal; however, Azzam suggested higher spatial frequency structures that would act as polarization sensitive Bragg reflectors. Such films reflect light within a band of wavelengths that has the same polarization handedness as the chiral film, and pass light of the orthogonal polarization. Examples of these structures were reported by Fan et al. in Optics Communications 147, 265 (1998), as well as by Hodgkinson and Wu in Applied Physics Letters 74(13), 1794 (1999). It is useful to note that these structures are artificial analogs of naturally occurring cholesteric liquid crystal materials. The optical properties of cholesterics are discussed by DeGennes and Prost in *The Physics of Liquid Crystals* ($2^{nd}$ ed., Clarendon Press, Oxford, 1993), chapter 6.

Similarly, Robbie and Brett in U.S. Pat. No. 5,866,204 describe methodologies for growing helical columns using the technique of oblique vapor deposition on a rotating substrate.

A third proposed application for porous films formed by oblique vapor deposition is as a micro-sieve. Robbie and Brett in the aforementioned patent point out that the volume density of obliquely deposited films can be made to vary between 10–90%. Further, the characteristic channel size in the films is in the nanometer regime. Both of these characteristics make them suitable for use as micro-sieves.

A fourth application of obliquely deposited films is as an alignment layer for liquid crystal displays. John L. Janning was the first to report on the "sympathetic alignment" of nematic liquid crystals on an obliquely deposited film in Applied Physics Letters 21(4), 173 (1972). In that work, an 8-$\mu$m-thick twisted nematic display was aligned using 7-nm-thick obliquely evaporated SiO films on the top and bottom display substrates. Lawrence A. Goodman et al. in IEEE Transactions on Electron Devices ED-24, 795 (1977) and Julian Cheng et al. in Applied Physics Letters 37(8), 716 (1980) provide physical descriptions of nematic alignment using porous columnar structures obtained via oblique depositions.

Akhlesh Lakhtakia et al. in Innovations in Materials Research 1(2), 165 (1996) and in Microwave and Optical Technology Letters 17(2), 135 (1998) mention the possibility of imbibing porous obliquely evaporated films with "suitable fluids" to obtain devices aimed at "some desired goal." However, this prior art lacks sufficient information to effectively fabricate switchable optical components.

It is therefore an object of this invention to utilize liquid crystal-imbibed obliquely evaporated films as switchable optical components.

It is another object of this invention to utilize liquid crystal-imbibed obliquely evaporated films to fabricate variable retarders.

It is yet another object of this invention to utilize liquid crystal-imbibed obliquely evaporated films to fabricate mirrors with electrically switchable reflectance.

SUMMARY OF THE INVENTION

The objects set forth above as well as further and other objects and advantages of the present invention are achieved by the embodiments of the invention described herinbelow.

The present invention relates to switchable optical components that are produced using a unique class of materials. These materials are thin film composites comprising of porous inorganic films imbibed with liquid crystal materials. The porous inorganic thin films are fabricated using the technique of vacuum deposition at an oblique angle of incidence. The liquid crystal materials possess an inherent large optical anisotropy that can be altered using an applied electric field or thermally, by heating or cooling the materials. When combined according to the present invention, the resulting composite materials exhibit large tunable optical indices. This enables the construction of variable retarders and mirrors with switchable reflectance. The composite materials described in the present invention will be referred to as dielectric confined liquid crystals, or DCLCs, in analogy with polymer dispersed liquid crystal materials, or PDLCs.

For a better understanding of the present invention, together with other and further objects thereof, reference is made to the accompanying drawings and detailed description.

DETAILED DESCRIPTION OF THE PREFERRED EMBODIMENTS

The present invention relates to switchable optical components based on dielectric confined liquid crystal (DCLC) materials and their methods of fabrication. The DCLC materials utilized here are a new class of composite materials that utilize confined, rather than bulk-layer liquid crystals. These composite materials are comprised of a porous nano-engineered dielectric host material that is imbibed with a liquid crystal material. The orientation of the confined liquid crystal molecules is influenced by the dielectric host, but may be altered by an applied electric field, or thermally, by heating or cooling the structure. Liquid crystal materials possessing a large, electrically or thermally tunable optical anisotropy render the optical indices of the composite structures tunable. The resulting DCLC materials may be configured as variable retarders or as mirrors with variable reflectance.

Figure 1:
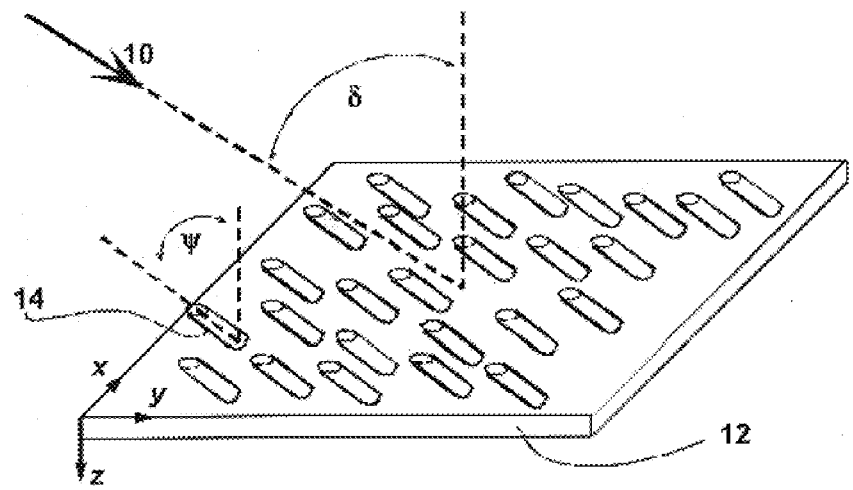
FIG. 1 is a schematic pictorial diagram of a nano-column film (NCF) formed by oblique vapor deposition within the concepts of this invention.

FIG. 1 is a schematic pictorial diagram showing a single plane of nano-columns formed by an oblique vacuum deposition. Such a layer will also be referred to as a nano-column film, or NCF. A vapor stream of evaporant material 10 is incident on a substrate 12 at an angle $\delta$ with respect to the substrate normal. The coordinate system in the figure is set-up so that the z-axis lies parallel to the substrate normal, and the yz-plane contains the direction vector of the evaporant vapor stream 10.

Self-shadowing and limited atomic mobility leads to the growth of nano-column structures on the substrate surface; a representative nano-column 14 is highlighted in the figure. It is well known in the art that these nano-columns lie in the plane of incidence of the vapor stream 10, and that the angle $\psi$ between the substrate normal and the long axis of the nano-columns is less than the evaporation angle $\delta$.

Figures 2A, 2B:
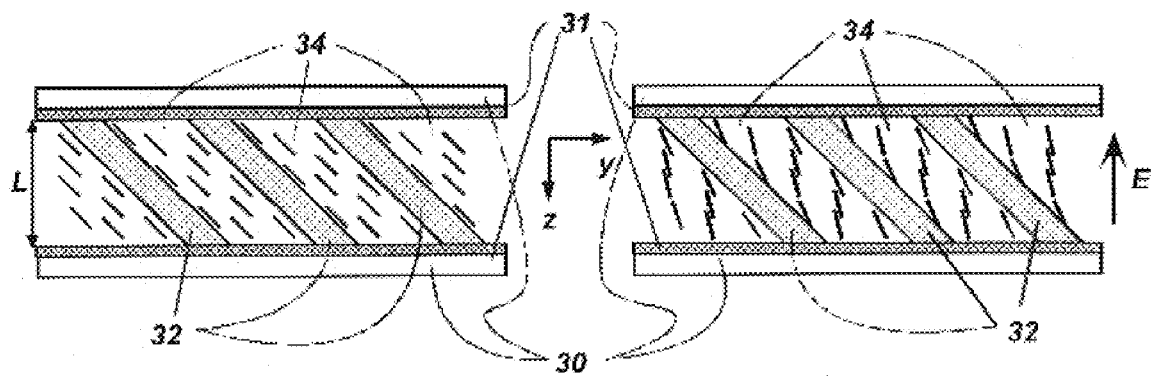
FIG. 2(a) illustrates a nematic liquid crystal-imbibed NCF in the absence of a field.
FIG. 2(b) illustrates a nematic liquid crystal-imbibed NCF under the influence of an applied electric field.

FIG. 2(a) shows a cross-sectional view of a single NCF that has been imbibed with a nematic liquid crystal. This composite structure is comprised of nano-columns 32 formed via the methods described above, and nematic liquid crystal, which fills the void regions 34 between the nano-columns 32. In this figure, the short line segments in the nematic regions 34 indicate the nematic directors, which are parallel with the long axis of the nematic liquid crystal molecule. The nematic is assumed to possess a positive dielectric anisotropy so that the directors tend to align along an axis parallel to the direction of an applied electric field. The composite film is confined between two substrates 30 that each have a transparent conducting film 31, such as indium tin oxide, or ITO, on the inside surfaces to facilitate the application of an electric field.

FIG. 2(a) indicates that in the absence of an applied field, the nematic directors are parallel with the nano-columns throughout the film. FIG. 2(b) shows that under the influence of a sufficiently strong electric field E that is parallel with the z-axis, the nematic directors reorient and thereby change the optical indices of refraction of the nematic-imbibed NCF. Such a structure can be utilized as a variable retarder. Alternatively, the nematic order shown in FIG. 2(a) may be significantly altered by heating the structure past the clearing temperature of the imbibed nematic 34. When heated past the clearing temperature, the nematic directors become randomly oriented. This also is a method for altering the optical indices of the imbibed NCF.

EXAMPLE 1

One variable retarder of the preferred embodiments of this invention relates to a variable retarder. More specifically, the device considered in this invention and as set forth in this example is an optically anisotropic film with electrically tunable birefringence that is comprised of a single DCLC layer. The DCLC shown in FIGS. 2a and 2b operates as a variable phase shifter or retarder for light incident along the z-axis. If the polarization plane of the incident light contains the x- or y-axes, the DCLC serves as a variable phase shifter; otherwise, the DCLC serves as a variable retarder.

A model is constructed to indicate the magnitude of the change in indices of refraction of a nematic-imbibed NCF under the influence of an electric field. Consider first a single NCF that is imbibed with an isotropic material. For example, the isotropic material may be air or a nematic liquid crystal above the clearing temperature. In this case, the optical dielectric tensor for the film is written $$\overleftrightarrow{\epsilon} = \epsilon_v \delta_{ij} + 4\pi N \overleftrightarrow{\alpha}_c, \quad (1)$$

where $\epsilon_v$ is the scalar optical dielectric constant of the regions between the nano-columns, $\delta_{ij}$ is the identity matrix, N is the nano-column number density, and $\overrightarrow{\alpha}_c$ is the polarizability tensor of a single nano-column.

Referring to FIG. 1, the nano-column polarizability is $$\overleftrightarrow{\alpha}_c = \begin{pmatrix} \alpha_\perp & 0 & 0 \\ 0 & \alpha_\perp + \Delta\alpha\sin^2\psi & \frac{1}{2}\Delta\alpha\sin 2\psi \\ 0 & \frac{1}{2}\Delta\alpha\sin 2\psi & \alpha_\perp + \Delta\alpha\cos^2\psi \end{pmatrix}, \quad (2)$$

where $\Delta\alpha = \alpha_\| - \alpha_\perp$ and where $\alpha_{\|,\perp}$ are the nano-column polarizability components parallel and perpendicular to the nano-column long axis, respectively. These polarizability components may be obtained utilizing the formalism described, for example, by M. Kerker in *The Scattering of Light and Other Electromagnetic Radiation* (Academic Press, N.Y., 1969) or by D. Rogovin in Physical Review A 32(5), 2837 (1985). Following work in those references, and in the limit that the nano-column height is much larger than the nano-column diameter, $\alpha_{\|,\perp}$ are given by $$\alpha_{\|} \rightarrow \frac{V}{4\pi} \cdot (n_c^2 - n_v^2), \tag{3a}$$

$$\alpha_{\perp} \rightarrow \frac{V}{4\pi} \cdot \frac{n_c^2 - n_v^2}{1 + \frac{1}{2}((n_c/n_v)^2 - 1) \cdot (1 - \phi_c)}. \tag{3b}$$

Here, V is the volume of a single nano-column, $n_c$ and $n_v$ are the indices of refraction of the nano-column material and inter-column regions, respectively, and $\phi_c = N \cdot V$ is the nano-column volume fraction in the film. Note that the expressions in Eqs. (3a) and (3b) take into account the Lorentz local field correction, as described by W. L. Bragg and A. B. Pippard in Acta Crystallographica 6, 865 (1953). The NCF indices may be found by substituting Eqs. (2), (3a) and (3b) into Eq. (1):

$$\in_x = n_x^2 = \in_v + 4\pi N \alpha_{\perp}, \tag{4a}$$

$$\in_y = n_y^2 = \in_v + 4\pi N (\alpha_{\perp} + \Delta\alpha \sin^2\psi). \tag{4b}$$

Finally, utilizing Eqs. (4a) and (4b), the average film index of refraction $\bar{n}_{2D}$ and film birefringence $\Delta n$ are found using the following expressions:

$$\bar{n}_{2D} = \sqrt{\bar{\varepsilon}_{2D}} = \sqrt{\frac{\varepsilon_x + \varepsilon_y}{2}}, \tag{5a}$$

$$\Delta n = n_y - n_x = \frac{\varepsilon_y - \varepsilon_x}{n_y + n_x} \approx \frac{\varepsilon_y - \varepsilon_x}{2\bar{n}_{2D}}. \tag{5b}$$

The NCF indices presented in Eqs. (5a) and (5b) are next generalized to allow for a NCF imbibed with an optically anisotropic fluid, viz. a nematic liquid crystal. This will allow a description of the electro-optical properties of various DCLC-based devices.

Nematic liquid crystals are comprised of cylindrically symmetric molecules that are characterized by optical indices $n_e$ along the director axis and $n_o$ perpendicular to the director. The inter-column regions 34, shown in FIG. 2(*a*), are therefore characterized by an anisotropic optical dielectric tensor $\vec{\in}_v$. The components of $\vec{\in}_v$ are a function of $n_e$, $n_o$, the electric field amplitude E, and the nano-column inclination angle $\psi$. Likewise, the index of the inter-column region $n_v$, which appears in the expressions for the nano-column polarizability components given by Eqs. (3a) and (3b), also depends on these same set of variables.

Utilizing the geometry given in FIGS. 2(*a*) and 2(*b*), the x-component of the DCLC optical dielectric tensor $\in_x^{OFF,ON}$ may be written for both the field-off state (FIG. 2(*a*)) and the field-on state (FIG. 2(*b*)), respectively. For both states, $\in_v \rightarrow \in_{vx} = n_o^2$ is substituted into Eq. (4a) and $n_v \rightarrow n_o$ is substituted into Eq. (3b) so that $$\varepsilon_x^{OFF} = \varepsilon_x^{ON} = n_o^2 \cdot \left[ \frac{1 + \frac{(1+\phi_c)}{2}((n_c/n_v)^2 - 1)}{1 + \frac{(1-\phi_c)}{2}((n_c/n_v)^2 - 1)} \right]. \tag{6}$$

Referring next to FIG. 2(*a*), the y-component of the DCLC optical dielectric tensor in the field-off state, $\in_y^{OFF}$, is found by substituting $\in_v \rightarrow \in_{vy} = n_{vy}^2(\psi)$ into Eq. (4b) and $n_v \rightarrow n_{vy}(\psi)$ into Eq. (3a). Here, $n_{vy}(\psi)$ is the inter-column index apparent to light propagating along the z-axis, and is given by $$n_{vy}^2(\psi) = \left[ \frac{\sin^2\psi}{n_e^2} + \frac{\cos^2\psi}{n_o^2} \right]^{-1}. \tag{7}$$

Thus, $\in_y^{OFF}$ is given by $$\varepsilon_y^{OFF} = \tag{8}$$

$$n_{vy}^2 \cdot \left\{ 1 + \phi_c((n_c/n_{vy})^2 - 1) \cdot \left[ \frac{1 + \frac{(1-\phi_c)}{2}((n_c/n_{vy})^2 - 1)\sin^2\psi}{1 + \frac{(1-\phi_c)}{2}((n_c/n_{vy})^2 - 1)} \right] \right\}.$$

Finally, the y-component of the DCLC dielectric tensor in the field-on state, $\in_y^{ON}$, is found. The nematic director configuration in the field-on state is shown schematically in FIG. 2(*b*); however, the present model simplifies this depiction by having all nematic directors pointing along the z-axis. This is an idealization because the nematic molecules nearest the nano-column surfaces are expected to remain parallel to those surfaces due to surface anchoring forces. Utilizing this simplifying assumption, $\in_y^{ON}$ is found by substituting $\in_v \rightarrow \in_{vy} = n_o^2$ into Eq. (4b) and $n_v \rightarrow n_o$ into Eq. (3b) to arrive at the following expression:

$$\varepsilon_y^{ON} = n_o^2 \cdot \left\{ 1 + \phi_c((n_c/n_o)^2 - 1) \left[ \frac{1 + \frac{(1-\phi_c)}{2}((n_c/n_o)^2 - 1)\sin^2\psi}{1 + \frac{(1-\phi_c)}{2}((n_c/n_o)^2 - 1)} \right] \right\}. \tag{9}$$

Equations (6), (8) and (9) are now substituted into Eq. (5) to obtain the DCLC birefringence:

$$\Delta n^i = \frac{1}{\sqrt{2}} \cdot \frac{\varepsilon_y^i - \varepsilon_x^i}{\sqrt{\varepsilon_y^i + \varepsilon_x^i}}; \quad i = \text{ON, OFF}. \tag{10}$$

In fact, the electrooptic (EO) tuning range of a DCLC film $\Delta n_{EO}$ is given by the difference between the field-on and field-off state birefringence values; that is, $$\Delta n_{EO} = \Delta n^{OFF} - \Delta n^{ON}. \tag{11}$$

Figure 3:
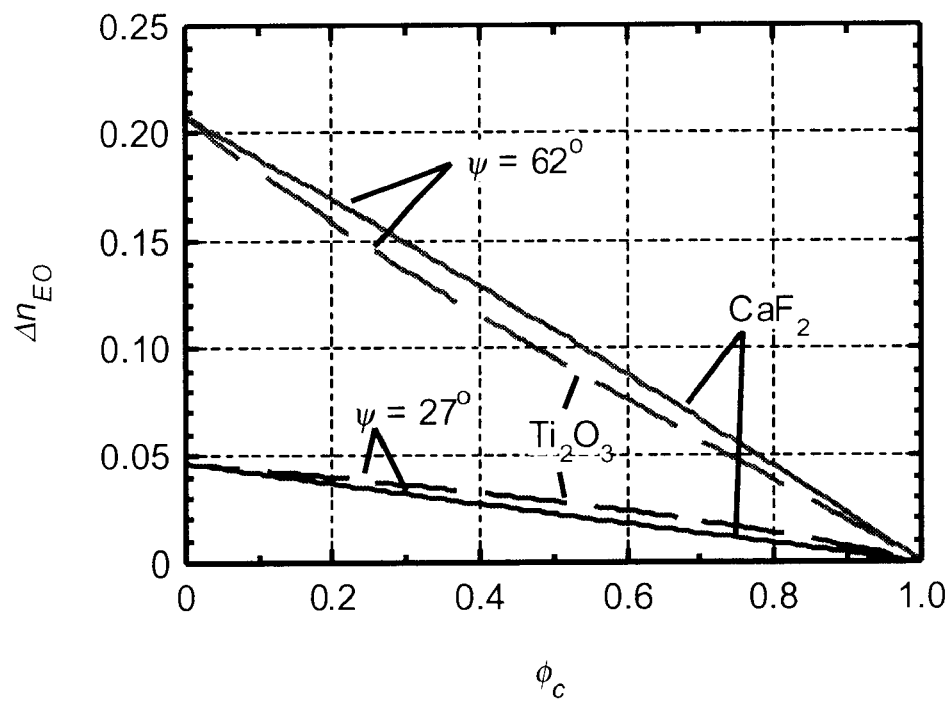
FIG. 3 is a graphical illustration of the variable birefringence for several DCLC material systems as a function of nano-column volume fraction within the concepts of this invention.

Equation (11) is plotted in FIG. 3 as a function of nano-column volume fraction $\phi_c$ for two composite material systems and two nano-column inclination angles $\psi$. For example, one material system is comprised of $CaF_2$ ($n_c=1.4$) nano-columns and nematic liquid crystal BL006 ($n_e=1.8160$ and $n_o=1.5300$) available from EM Industries of Hawthorne, N.Y. Another example is found in the second material system comprised of $Ti_2O_3$ ($n_c=2.3$) nano-columns and BL006 nematic. It is evident from the figure that $\Delta n_{EO}$ is relatively insensitive to the nano-column material, but is a strong function of nano-column inclination angle and volume fraction.

Utilizing the data in FIG. 3, consider a tunable DCLC half-wave retarder based on a $CaF_2/BL006$ DCLC with $\psi=62°$ and $\phi_c=0.3$. This DCLC film has $\Delta n_{EO} \approx 0.15$; thus, the film thickness required to achieve a half-wave retardance at a wavelength of $\lambda=1550$ nm is just $L=5.2$ μm.

EXAMPLE 2

Another preferred embodiment of this invention relates to switchable optical mirrors. More specifically, mirrors made from multi-layer DCLC stacks that have electrically tunable reflectance are also described in the present invention. These devices were modeled using a 4×4 numerical code that was developed by Dwight Berreman in The Journal of the Optical Society of America 62(4), 502 (1972).

Figure 4A:
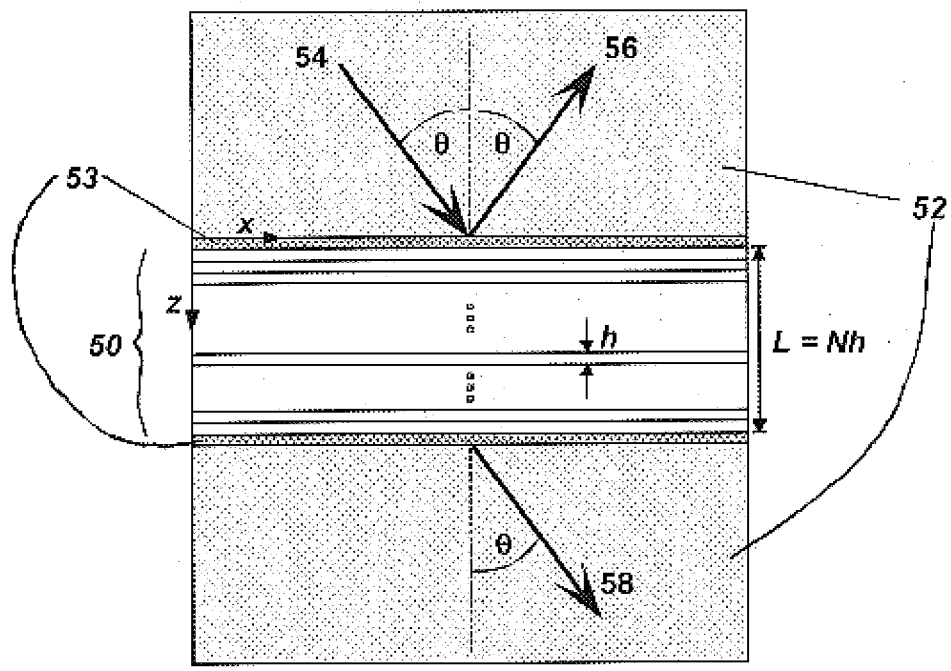
FIG. 4(a) is a schematic side view of a stack of DCLC layers of this invention configured as a switchable mirror.

FIG. 4(a) shows a stack of DCLC layers 50 between two substrates 52 that are each coated with a layer of ITO 53. The DCLC stack 50 has a total thickness L=N·h, where N is the number of DCLC layers and h is the thickness of an individual DCLC layer. The present discussion considers DCLC layers with uniform thickness h; however, it is known that useful reflective structures can be made using stacks comprised of layers that do not have a uniform thickness. Referring again to FIG. 4(a), the incident optical beam 54, reflected beam 56, and transmitted beam 58 all lie in the xz-plane and propagate at an angle θ with respect to the DCLC-stack normal, which in this case is parallel to the z-axis. Note that θ is measured within the substrate 52. Also, for the purpose of simplifying the DCLC mirror model, the substrate index $n_s$ is chosen to be equal to the average index of the DCLC stack.

Figure 4B:
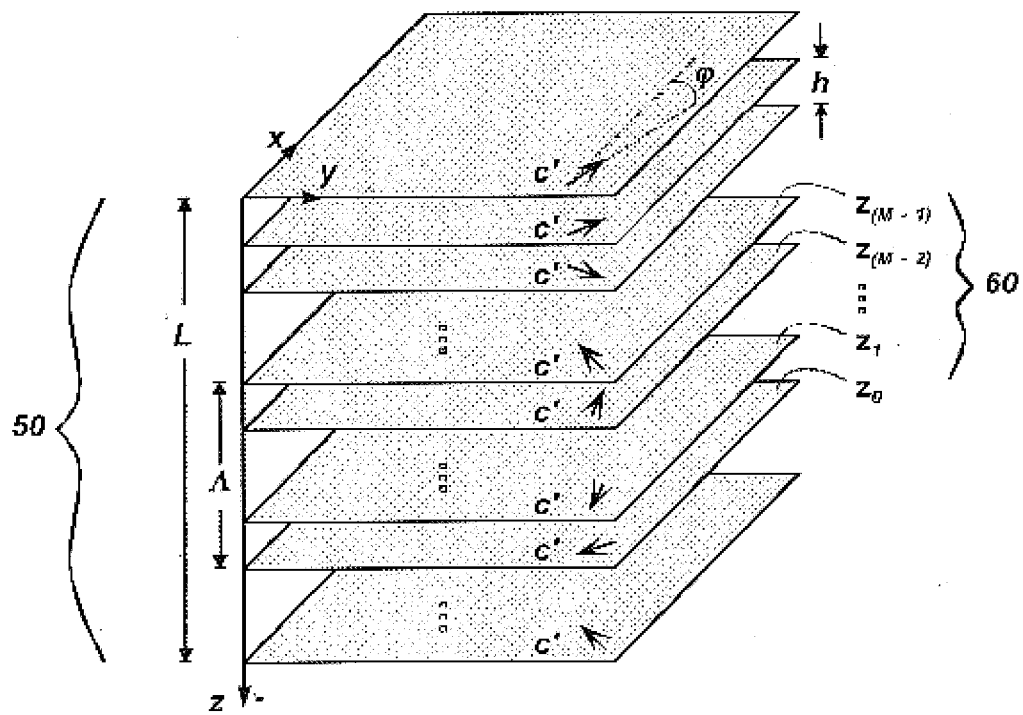
FIG. 4(b) is an exploded pictorial view of the DCLC stack of this invention.

FIG. 4(b) shows an exploded view of DCLC stack 50. The DCLC stack 50 has thickness L and is comprised of N-DCLC layers, each with thickness h. As described in the previous example, each layer is optically anisotropic. While each of the layers has identical optical indices, in the mirror configuration, the layers have a z-dependent optic axis orientation, as denoted in the figure by an arrow that labels the c'-axis for each layer. Here, the c'-axis is the projection of the layer c-axis, or optic axis, in the xy-plane. The orientation of the c'-axis is denoted by φ, as drawn in FIG. 4(b) for the topmost plane only of the DCLC stack. The angle φ is referred to as the azimuthal angle, and it is a measure of the angle between the c'-axis and the x-axis; each layer of the DCLC stack may have a unique azimuthal angle value. Note also, that M-DCLC layers have been explicitly labeled at positions $z_0, z_1, \ldots z_{M-1}$. This group of layers with total thickness Λ=M·h is a repeating sub-structure within the multi-layer stack.

Two DCLC mirror structures are described in this invention based on the structures shown schematically in FIGS. 4(a) and 4(b). One structure is a quarter-wave stack and the second is a chiral stack. The material system chosen to illustrate these mirrors is a $CaF_2$/BL006 composite with nano-column volume fraction $\phi_c$=0.30 and inclination angle ψ=62°. This DCLC material system was chosen because of the large range in layer birefringence that it exhibits, viz. $\Delta n^{OFF}$=0.1512 to $\Delta n^{ON}$=0.0018 [see Eq. (10)]. Note that the field-off birefringence is large, which is desirable for achieving high bandwidth, high reflectance mirrors with relatively few DCLC layers. Note also that the field-on birefringence is quite small, which is a requirement for achieving high contrast mirrors.

The first DCLC mirror configuration that is described is the DCLC quarter-wave stack. In this configuration, the repeating sub-structure consists of two layers with orthogonal c'-axes. That is, the difference in azimuthal angle values of any two adjacent layers is 90 degrees. Two devices were modeled based on the quarter-wave DCLC stack. Both are designed to operate at a wavelength around $\lambda_c$=1550 nm; however, one is designed to operate at normal incidence (θ=0) and the other is designed to operate at θ=45°. Since the DCLC layer thickness is given by h=$\lambda_c/(4\bar{n}_{2D}^{OFF} \cdot \cos\theta)$, where $\bar{n}_{2D}^{OFF}$ is given by Eq. (10), the layer thickness values are h=247, 350 nm for θ=0, 45°, respectively.

Figure 5:
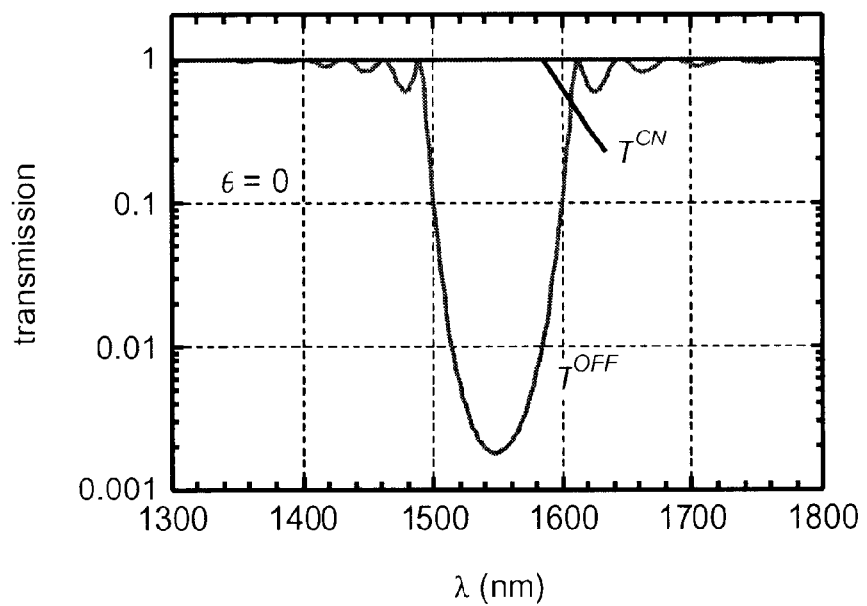
FIG. 5 graphically illustrates the transmission spectrum of a switchable DCLC mirror based on a quarter-wave stack, designed for normal incidence operation within the concepts of this invention.
Figure 6:
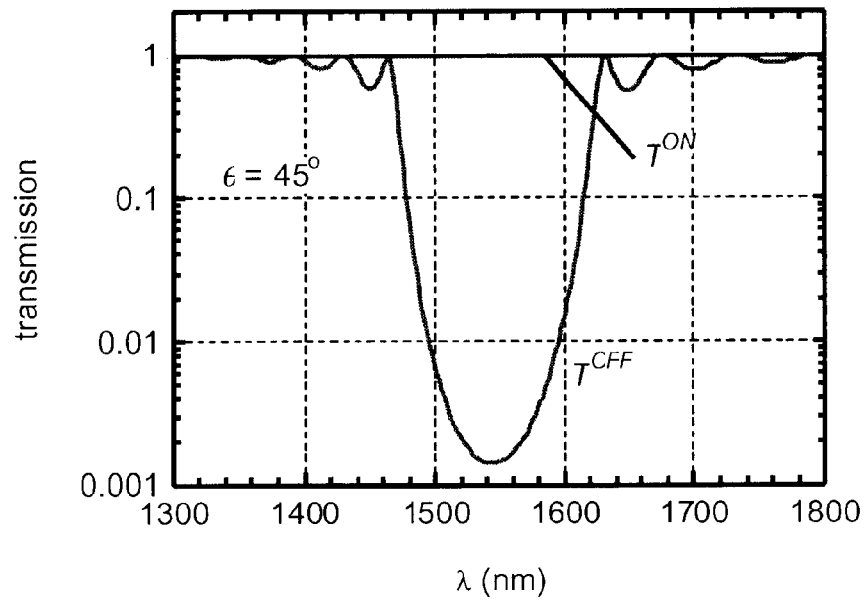
FIG. 6 graphically illustrates the transmission spectrum of a switchable DCLC mirror based on a quarter-wave stack, designed for operation at an oblique incidence angle within the concepts of this invention.

FIGS. 5 and 6 show the transmission of the two switchable quarter-wave mirrors based on DCLCs. FIG. 5 is the transmission of the normal incidence device. This structure is comprised of 40 periods and has a total thickness of L=19.8 μm. In the figure, $T^{OFF,ON}$ refer to the mirror transmission in the field-off and field-on conditions, respectively. FIG. 6 shows the transmission of the device designed for operation at θ=45°. This device is comprised of 30 periods for a total thickness of L=20.8 μm. The contrast between $T^{ON}$ and $T^{OFF}$ is 27.4 dB for the 40-period DCLC mirror, and is 28.4 dB for the 30-period mirror; both values are quite good.

Another important metric for quantifying the performance of these mirrors is the polarization dependent loss, or PDL. Defining PDL as $$PDL = 10\left[\log\left(\frac{T_p^{ON}}{T_p^{OFF}}\right) - \log\left(\frac{T_s^{ON}}{T_s^{OFF}}\right)\right], \quad (12)$$

where $T_{p,s}^{OFF,ON}$ refer to the field-off and field-on state transmission values for p- and s-polarized incident light. The PDL for the 40-period mirror is identically zero, while the PDL=0.003 dB for the 30-period (θ=45°) DCLC mirror. These results indicate that optical switches based on DCLC mirrors exhibit good contrast and very low PDL. This is a distinct advantage over other switches based on liquid crystals.

The second DCLC mirror configuration of this invention is the DCLC chiral stack. One unique property of the chiral DCLC mirror configurations is the polarization specific reflection property. In analogy with planar texture cholesteric liquid crystals, chiral DCLCs exhibit a selective reflection band centered at wavelength $\lambda_c$ given by $$\lambda_c = \bar{n}_{2D}^{OFF} \cdot p \cdot \cos\theta, \quad (13)$$

where P is equal to twice the spatial period of the DCLC structure—i.e. p=2Λ—and θ is the incidence angle in the DCLC medium.

The chiral DCLC mirrors that will be discussed here are made of a discrete number of DCLC layers, such as the structure shown in FIG. 4(b). However, chiral DCLC mirrors may also be fabricated via oblique evaporation onto a continuously rotating substrate. The resulting structure produced via the latter procedure is also a porous, chiral reflective structure that can be imbibed with a nematic liquid crystal to yield a chiral mirror with variable reflectance.

Referring again to FIG. 4(b), the DCLC chiral stack of this invention is characterized by a repeating sub-structure 60 wherein the c'-axis of successive layers spirals about the z-axis. When the c'-axis spirals about the z-axis in a left-handed (LH) sense, the structure possesses LH chirality; when the c'-axis spirals about the z-axis in a right-handed (RH) sense, the structure possesses RH chirality. A LH chiral DCLC stack will reflect left-hand circularly polarized (LCP) light within the selective reflection band of the structure, while a RH chiral DCLC stack will reflect right-hand circularly polarized (RCP) light within the selective reflection band of the structure.

Figure 7:
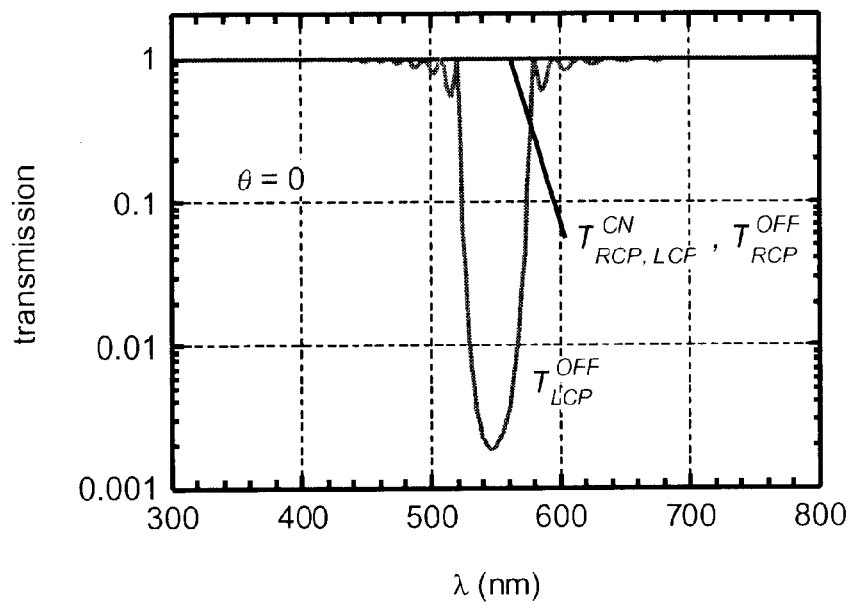
FIG. 7 graphically illustrates the transmission spectrum of a switchable chiral DCLC mirror of this invention designed for use at normal incidence.
Figure 8:
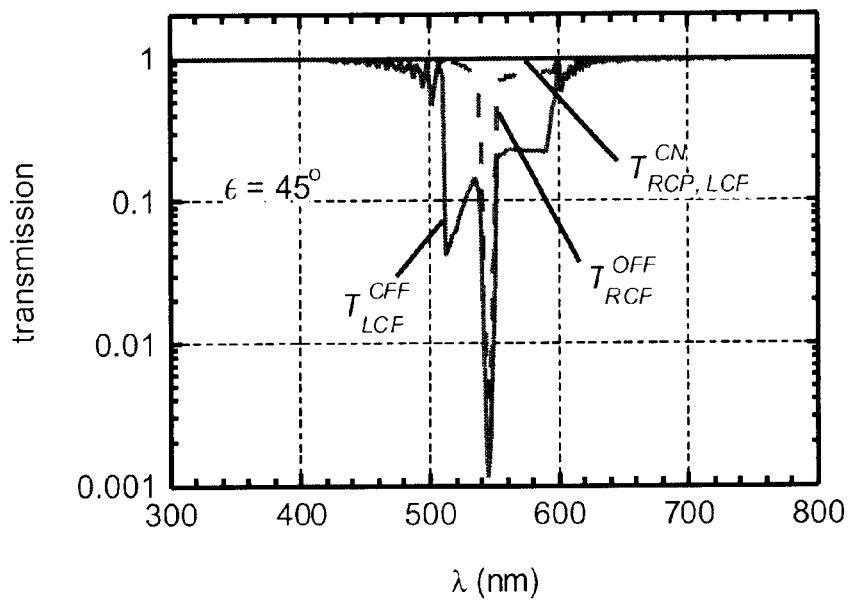
FIG. 8 graphically illustrates the transmission spectrum of a switchable chiral DCLC mirror of this invention designed for use at oblique incidence.

Examples of transmission characteristics for two electrically tunable chiral DCLC mirrors are illustrated in FIGS. 7 and 8. These figures show the polarization-resolved transmission values, $T_{RCP}^{OFF,ON}$ and $T_{LCP}^{OFF,ON}$, as a function of wavelength, for the two mirrors in the field-off and field-on states. Note that the subscripts RCP and LCP refer to right- and left-hand circularly polarized incident light. Both mirrors are left-hand chiral and contain 8 individual DCLC layers per pitch, p, with a reflection band centered at $\lambda_c$=543 nm. The mirror modeled in FIG. 7 is designed for normal incidence light and is comprised of a 15-pitch DCLC with a total thickness of 5.26 m. The mirror modeled in FIG. 8 is designed for light incident at θ=45° and is comprised of a 50-pitch DCLC with a total thickness 24.8 m.

A few features from FIGS. 7 and 8 are noteworthy. First, the normal incidence chiral mirror reflects only LCP light in the field-off state, because the mirror spatial structure is left-hand chiral, as is shown in FIG. 7. The maximum polarization extinction ratio for this mirror is 27.2 dB, which happens to be equal to the field-off:field-on, or switching, contrast ratio. The field-off state transmission spectra shown in FIG. 8 for the chiral mirror designed for use at oblique incidence angle show a total reflection band near the design wavelength of 543 nm. This total reflection band is also present in static, planar texture cholesteric liquid crystals, as documented by Takezoe et al. in The Japanese Journal of Applied Physics 22(7), 1080 (1983). This mirror exhibits a switching contrast of 29.6 dB for LCP light, and a contrast of 23.9 dB for RCP light.

Although the invention has been described with respect to various embodiments, it should be realized this invention is also capable of a wide variety of further and other embodiments within the spirit and scope of the invention.

What is claimed is:

1. A variable retarder comprising:
   a first substrate coated with a transparent conductor;
   a porous, thin film positioned on said transparent conductor with its optic axis pointing in a direction that falls between a plane that is parallel with said first substrate and a line that is normal to said first substrate;
   said porous thin film imbibed with a liquid crystal;
   a second substrate coated with another transparent conductor disposed on said liquid crystal-imbibed porous thin film; and
   a surface of said another transparent conductor being in contact with said liquid crystal-imbibed porous thin film.

2. The variable retarder as defined in claim 1 wherein said porous thin film is fabricated by vacuum deposition in which the evaporant is incident on said first substrate at an oblique angle of incidence.

3. The variable retarder as defined in claim 1 wherein said liquid crystal is a nematic liquid crystal.

4. A switchable mirror comprising:
   a first substrate coated with a transparent conductor;
   a plurality of porous thin film layers positioned on said transparent conductor;
   each of said plurality of porous thin film layers having an optic axis pointing in a direction that falls between a line that is normal to said first substrate and a plane that is parallel with said first substrate, and said optic axis of each of said plurality of porous thin film layers having a component that lies in said plane that is parallel with said first substrate;
   said optic axis component of each of said plurality of porous thin film layers having an azimuthal angular orientation about said line that is normal to said first substrate;
   said plurality of porous thin film layers being arranged according to said azimuthal angular orientation of said optic axis component;
   said plurality of porous thin film layers imbibed with a liquid crystal;
   a second substrate coated with another transparent conductor disposed on said plurality of said liquid crystal-imbibed porous thin film layers; and
   a surface of said another transparent conductor being in contact with an adjacent one of said liquid crystal-imbibed porous thin film layers.

5. The switchable mirror of claim 4 wherein each of said liquid crystal-imbibed porous thin film layers has a thickness h given by $h=\lambda_c/(4\bar{n}_{2D}^{OFF} \cdot \cos\theta)$ where $\lambda_c$ is a wavelength in vacuum of light incident on said mirror, $\bar{n}_{2D}^{OFF}$ is an average index of refraction of each of said liquid crystal-imbibed porous thin film layers in the absence of an applied electric field, and $\theta$ is an incidence angle of said incident light to each of said liquid crystal-imbibed porous thin film layers, as measured from said line that is normal to said first substrate.

6. The switchable mirror of claim 5 wherein said azimuthal angular orientation of said optic axis component of each adjacent one of said plurality of porous thin film layers is 90 degrees.

7. The switchable mirror of claim 4 wherein said azimuthal angular orientation of said optic axis component of said liquid crystal-imbibed porous thin layers are angularly offset from one another so as to spiral about said line that is normal to said first substrate in a left- or right-handed sense.

8. The switchable mirror of claim 4 wherein at least one of said liquid crystal-imbibed porous thin film layers is fabricated by vacuum deposition in which the evaporant is incident on said first substrate at an oblique angle of incidence.

9. The switchable mirror of claim 4 wherein said liquid crystal is a nematic liquid crystal.

10. A method of fabricating a switchable optical component comprising the steps of:
    providing a first substrate with a transparent conductor;
    positioning at least one porous thin film on said transparent conductor with its optic axis pointing in a direction that falls between a plane that is parallel with said first substrate and a line that is normal to said first substrate;
    imbibing said at least one porous thin film with a liquid crystal;
    providing a second substrate with another transparent conductor disposed on said liquid crystal-imbibed porous thin film; and
    contacting a surface of said another transparent conductor with said at least one liquid crystal-imbibed porous thin film.

11. The method as defined in claim 10 further comprising the step of fabricating said at least one porous thin film by vacuum deposition in which the evaporant is incident on said first substrate at an oblique angle of incidence.

12. The method of claim 11 wherein said liquid crystal is a nematic liquid crystal.

13. The method of claim 11 wherein said switchable optical component is a variable retarder.

14. The method of claim 11 wherein said switchable optical component is a switchable mirror.

15. The method of claim 10 further comprising the step of providing a plurality of porous thin film layers positioned on said transparent conductor.

16. The method of claim 15 further comprising the steps of:
    having said optic axis component of each of said plurality of porous thin film layers having an azimuthal angular orientation about said line that is normal to said first substrate; and
    arranging said plurality of porous thin film layers according to said azimuthal angular orientation of said optic axis component.

* * * * *